United States Patent
Makram-Ebeid

(10) Patent No.: US 7,529,392 B2
(45) Date of Patent: May 5, 2009

(54) IMAGE PROCESSING SYSTEM AND MEDICAL EXAMINATION APPARATUS FOR CORRELATING FEATURES IN MEDICAL IMAGES

(75) Inventor: Shérif Makram-Ebeid, Dampierre (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 602 days.

(21) Appl. No.: 10/536,813

(22) PCT Filed: Nov. 20, 2003

(86) PCT No.: PCT/IB03/05319

§ 371 (c)(1),
(2), (4) Date: May 27, 2005

(87) PCT Pub. No.: WO2004/049259

PCT Pub. Date: Jun. 10, 2004

(65) Prior Publication Data

US 2006/0056669 A1    Mar. 16, 2006

(30) Foreign Application Priority Data

Nov. 27, 2002 (EP) .................. 02292932

(51) Int. Cl.
*G06K 9/00* (2006.01)
(52) U.S. Cl. .................. 382/128; 382/131; 382/280; 382/275; 382/312; 382/100; 342/378; 342/377; 359/29; 359/31; 359/279
(58) Field of Classification Search .................. 382/100, 382/128, 280, 181, 199, 266, 254, 274, 275, 382/312, 255; 351/221; 707/1; 359/29, 359/31, 279
See application file for complete search history.

(56) References Cited

U.S. PATENT DOCUMENTS 4,905,081 A * 2/1990 Morton .................. 348/43
6,078,680 A * 6/2000 Yoshida et al. .............. 382/128

(Continued)

FOREIGN PATENT DOCUMENTS

EP  WO 2004/049259  * 6/2004
FR  0480807  * 10/1991

OTHER PUBLICATIONS

Towards real time Multi-modality 3-D medical image registration, IEEE 2001.*
A new Orthogonal Transform for signal coding, IEEE 1988, Haddad et al.*

(Continued)

*Primary Examiner*—Jingge Wu
*Assistant Examiner*—Nancy Bitar

(57) ABSTRACT

An image processing system, for correlating shapes in multi-dimensional images including image data processor for estimating a similarity measure including estimating two image signals representing shapes defined in respective windows in two multi-dimensional images using a Hermite Transform applied to both the image signals for performing an evaluation of two first sets of scalar valued Hermite coefficients from which a combination yields a transformed set of scalar valued Hermite coefficients $\{K_J\}$. The inverse Hermite Transform is applied to the transformed set of scalar valued Hermite coefficients to achieve the computation of a windowed correlation function. The maximum of the windowed correlation function is estimated as the wanted similarity measure to correlate the shapes. The correlated shapes and/or processed images are displayed.

11 Claims, 3 Drawing Sheets

U.S. PATENT DOCUMENTS

| | | | | |
|---|---|---|---|---|
| 6,650,476 | B1 * | 11/2003 | Ludwig | 359/559 |
| 6,658,145 | B1 * | 12/2003 | Silver et al. | 382/149 |
| 7,016,539 | B1 * | 3/2006 | Silver et al. | 382/216 |
| 7,039,252 | B2 * | 5/2006 | Ludwig | 382/280 |
| 7,054,504 | B2 * | 5/2006 | Ludwig | 382/280 |
| 2005/0018885 | A1 * | 1/2005 | Chen et al. | |
| 2006/0120580 | A1 * | 6/2006 | Makram-Ebeid et al. | 382/128 |

OTHER PUBLICATIONS

T. Netsch, P. Rosch, A. van Muiswinkel and J. Weese in the publication "Towards real-time multi-modality 3-D medical image registration", Computer Vision, 2001. Proc. of Eighth IEEE Intl Conf. vol. 1 pp. 718-725 (2001).

* cited by examiner

IMAGE PROCESSING SYSTEM AND MEDICAL EXAMINATION APPARATUS FOR CORRELATING FEATURES IN MEDICAL IMAGES

FIELD OF THE INVENTION

The invention relates to an image processing system having data processing means for correlating features in medical images and to a medical examination apparatus having such an image processing system. The present invention relates to an image processing method having data processing steps, to be used in the system and apparatus. The invention also relates to a computer program product having instructions for carrying out the method steps. The invention finds its application in the field of medical imaging and, more especially, in the field of ultrasound medical imaging.

Matching one shape with respect to another is often needed in particular to compare medical images together. The amount of calculations needed is often problematic when dealing with 2D or 3D images or when a time sequence of such images has to be processed. The need for computationally efficient and accurate procedures is most acute when dealing with real-time applications.

BACKGROUND OF THE INVENTION

An Image Registration Technique is already described by T. Netsch, P. Rösch, A. van Muiswinkel and J. Weese in the publication entitled "Towards real-time multi-modality 3-D medical image registration", Computer Vision, 2001. ICCV 2001, Proceedings of Eighth IEEE International Conference, vol. 1, pp. 718-725 (2001). This cited Reference compares Medical Image Registration based on "Mutual Information" and "Local Correlation. The "Local Correlation" based method produces better or superior results to those of "Mutual Information", and besides requires considerably fewer computations. The "Local Correlation" used in the method is a similarity measure of gray-levels within pairs of small regions, defined by "windows", in two images to be matched together. The registration then consists in looking for the transformation of one image that will result in the largest possible value of the sum of such "Local Correlations" over pairs of corresponding windows in the two images. Different strategies are proposed in the cited publication to select the windows in each of the images being compared and to select which pairs of windows have to be compared. The choice of the strategy basically depends on the nature of transformation needed, called rigid or non-rigid transformations.

Even though results obtained with the "Local Correlation" based technique are promising, computation times are still a problem when dealing with large image data, in particular in the case of image processing in real time and in 3-D. Furthermore, robustness has to be improved in particular when dealing with non-rigid registration. To avoid matching together local shapes, which are only partly similar, the windows to compare with each other have to be large. In this case, each "Local Correlation" evaluation is computation intensive because it often involves image warping procedures requiring complex numerical algorithms.

SUMMARY OF THE INVENTION

It is an object of the invention to propose an image processing system to quickly and accurately register one shape relative to another shape that are each defined within an image window. This system is applicable to match shapes observable in image signal or image data with any number of dimensions such as: 1D signals, 2D, 3D, 2D+time, 3D+time images. The present system further allows of determining the image transformation that provides the best match between two shapes that are each defined within a window. It is a further object of the invention to provide a system that is especially appropriate to match two objects, having complex shapes. This system is applicable to set in correspondence one part of the complex shape of a first image with one part of the complex shape of a second image in order to perform local correlation of said parts of the first and second complex shapes.

The main means of this system are recited in Claim 1. Specific embodiments of the invention are claimed in dependent claims. An image processing method is proposed to be operated in this system.

The medical image processing system can be implemented as a specially programmed general-purpose computer. The medical image processing system can be a workstation. The present invention yet further provides a computer program product having a set of instructions, when in use on a general-purpose computer, to cause the computer to perform the steps of the method. The present invention still further provides a medical examination apparatus incorporating medical image processing system putting into practice the method to process medical image data obtained by the imaging apparatus, and means for visualizing the image data produced by the method. The visualization means typically consists of a monitor connected to the data processing apparatus. Advantageously, the workstation and medical imaging system of the present invention are interactive, allowing the user to influence clinical data that are evaluated and/or the manner in which evaluated data is to be visualized.

BRIEF DESCRIPTION OF THE DRAWINGS

The invention and additional features, which may be optionally used to implement the invention to advantage, are described hereafter with reference to the schematic figures, where.

DESCRIPTION OF EMBODIMENTS

Figure 1:
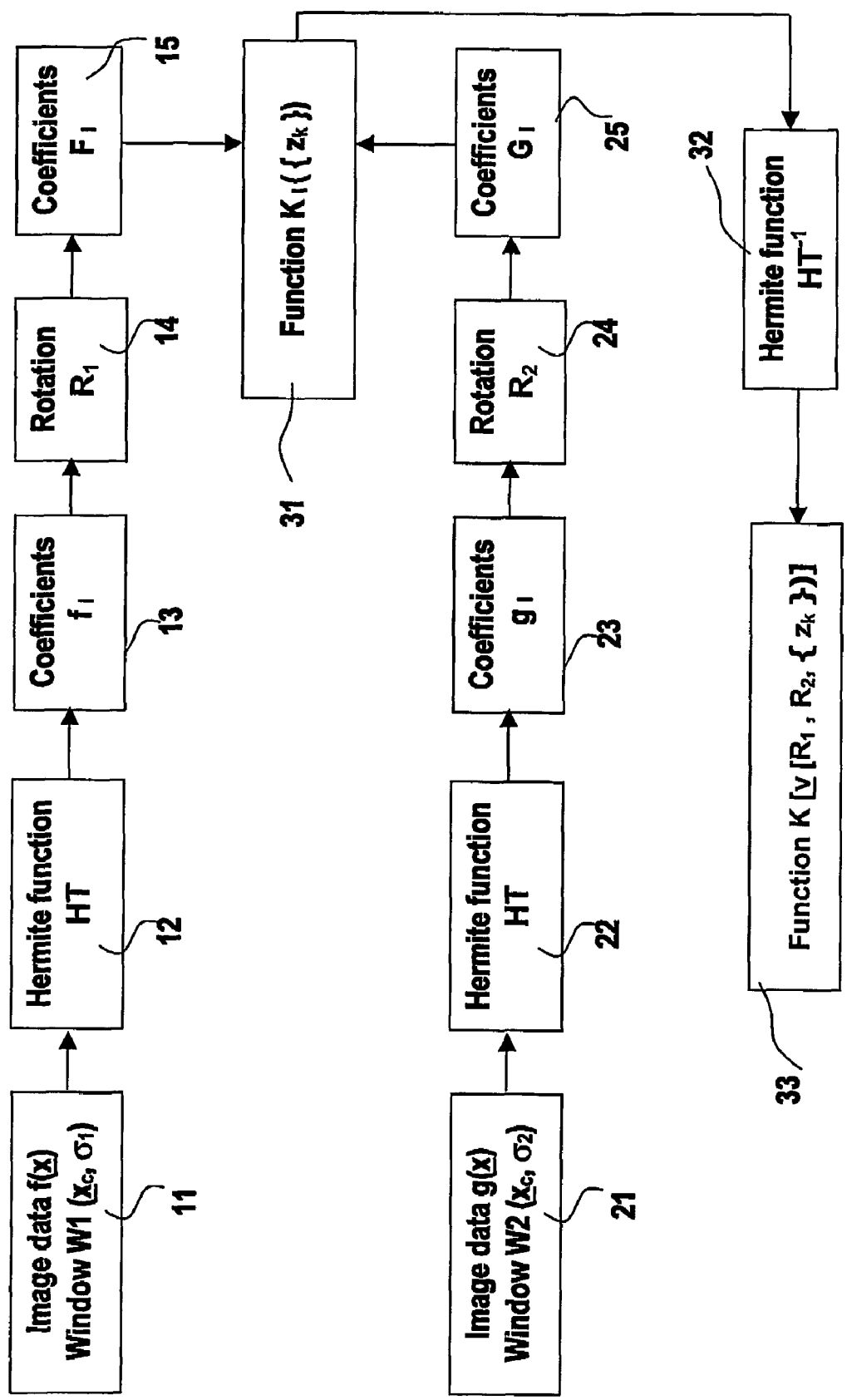
FIG. 1 is a functional block diagram of the correlation means of the imaging system of the invention.

An image processing method is first described. This method has steps of correlating features, hereafter called shapes, in medical images. The invention further relates to a medical image processing system having means for carrying out this method and having viewing means to visualize images. The invention also relates to a medical examination apparatus having such an image processing system.

The invention defines an image processing method to find a similarity measure between two shapes each defined within a Gaussian window. It provides the key components for quickly and accurately matching two objects having complex shapes in medical images. The processing method requires prior computation of "Hermite Transforms" of the shapes to match together within their respective windows. This operation allows of representing each of the shapes to be matched by a set of "scalar valued Hermite Transform coefficients". These scalar valued Hermite coefficients can be ordered in such a way that low-order coefficients code the coarse shape information whereas the high order coefficients code fine details. The new proposed processing method provides a way to compute the correlation between the shapes to match in a computationally simple manner by combining the scalar valued Hermite Transform coefficients related to the two shapes. This allows of computationally efficiently determining the best matching transformation. The computation burden is particularly small if coarse transformation estimates are required. It is particularly suited for a coarse to fine registration approach.

In the new processing method, the class of transformations, which can be simultaneously dealt with, are:

for any data dimension: translation, scale-change; and, in addition for data dimensions higher than 1D: rotation, anisotropic scale change.

This method is especially appropriate to match two objects having complex shapes. This method is applicable to set in correspondence one part of the complex shape of the first object with one part of the complex shape of the second object in order to perform a local correlation of said parts of the first and second complex shapes.

The processing method is suited to match shapes in medical images, which either come from a single imaging modality, modalities. such as Ultrasound, X-ray, MRI or Nuclear Isotope Imaging, or to match together shapes observable in images of different modalities.

The present invention preferably makes use of mathematical tools based on a polynomial functions such as the Hermite transform. Said Hermite Transform allows the analysis of a 1-dimensional image signal (1-D) or of a m-dimensional image signal (m-D) with m>1 within an isotropic Gaussian Window characterized by a size parameter $\sigma$. This allows to represent the data by a set of "scalar valued Hermite Coefficients" which can be ordered in such a way that low order coefficients represent coarse, or low frequency, shape information within the Gaussian windows, whereas high order coefficients represent finer details, or high frequencies. Essentially, a Hermite Transform allows to reconstruct the original signal or image data within a Gaussian window with very small error near the center of the Gaussian window, for example within a distance less than $2\sigma$ from the window center.

The steps of the method of the invention are illustrated by the block-diagram of FIG. 1. FIG. 1 is a block diagram for the computation of the windowed correlation function $K(\underline{v})$ for image signals $f(\underline{x})$ and $g(\underline{y})$ respectively. Each of the two image signals is defined within a given Gaussian window W1, W2 around center points $\underline{x}_c$ and $\underline{y}_x$ respectively. The sizes of the two windows W1, W2 are defined by the scale parameters $\sigma_1$ and $\sigma_2$ respectively. HT stands for taking the Hermite Transform to convert a scalar valued signal $f(\underline{x})$ or $g(\underline{y})$ into a set of scalar valued Hermite coefficients. This image processing method can apply to image signals depending on one independent variable corresponding to 1-dimensional (1-D) image or can apply to image signals having m independent variables corresponding to m-dimensional images (m-D images). The scalar valued Hermite coefficients depend on indices I, which are either simple non-negative integers in 1-D or multiple indices (vectors of m-integer indices). The boxes marked rotation $R_1$ or $R_2$ are applicable only for m>1. They convert the set of scalar valued Hermite coefficients into a new set corresponding to a rotated version of the corresponding image. The box marked $HT^{-1}$ takes the scalar valued Hermite correlation coefficients $K_I$ and produces the correlation function $K(\underline{v})$ computed to a desired accuracy. Best matching occurs when the translation parameter $\underline{v}$ together with those defining relative scaling factors $\{z_k\}$ as well as the rotations $R_1$ and $R_2$ of image signals $f(x)$ and $g(y)$ result in the highest value of $K(\underline{v})$. The steps of this method are described hereafter in detail, comprising:

In an image, definition of the image intensity f in function of the location of each image pixel or image voxel. So, the scalar value image intensity f is given as function of the real positional coordinates. In the present method of the invention, for correlating two shapes found in two images or in two parts of an image, two m-dimensional signals or image intensities $f(\underline{x})$ and $g(\underline{y})$, are respectively defined in steps referenced 11, 21, with $m \geq 1$.

Besides, a positive valued function is introduced to define a fuzzy observation window W in the image. Each signal or image intensity is defined within a respective window called first window W1 and second window W2. The windows W1, W2 are respectively centered around points $\underline{x}_c$ and $\underline{y}_c$. The windows are each defined by respective size parameters $\sigma_1$ and $\sigma_2$. A fuzzy Gaussian window function is associated with each of these windows, which is maximum near the window center and decays proportionally to $\exp(-(d_q/\sigma_q)^2)$ when moving away from the window center where $d_q$ is the distance from the respective window center, where subscript q is 1 for the first window and 2 for the second window.

The present method has further steps to form a correlation algorithm as follows:

Steps referenced 12, 22, for evaluation of the Hermite Transform, denoted by HT, applied to $f(\underline{x})$ and $g(\underline{y})$ each in its respective window W1, W2. This operation results in two sets of scalar valued Hermite Transform coefficients $\{f_I\}$ and $\{g_I\}$ respectively, referenced 13, 23, where each coefficient is labeled with an index I, which is just a non-negative integer (i) for 1-D signals where m=1, or is a multiple index $I=(i_1, \ldots, i_m)$ for multidimensional image data where m>1.

Steps referenced 14, 24 for operating rotations. For data dimension m larger than 1, the image signals $f(\underline{x})$ and $g(\underline{y})$ may be rotated around their respective window center $\underline{x}_C$, $\underline{y}_C$ using respectively (m×m) rotation matrices $R_1$ and $R_2$. According to the invention, these rotations are not operated on the original image signals $f(\underline{x})$ and $g(\underline{y})$. Instead, they are operated on the scalar valued Hermite Transformed Coefficients $\{f_I\}$ and $\{g_I\}$ respectively making use of the fact their values convert under rotation like tensors.

Figure 2A:
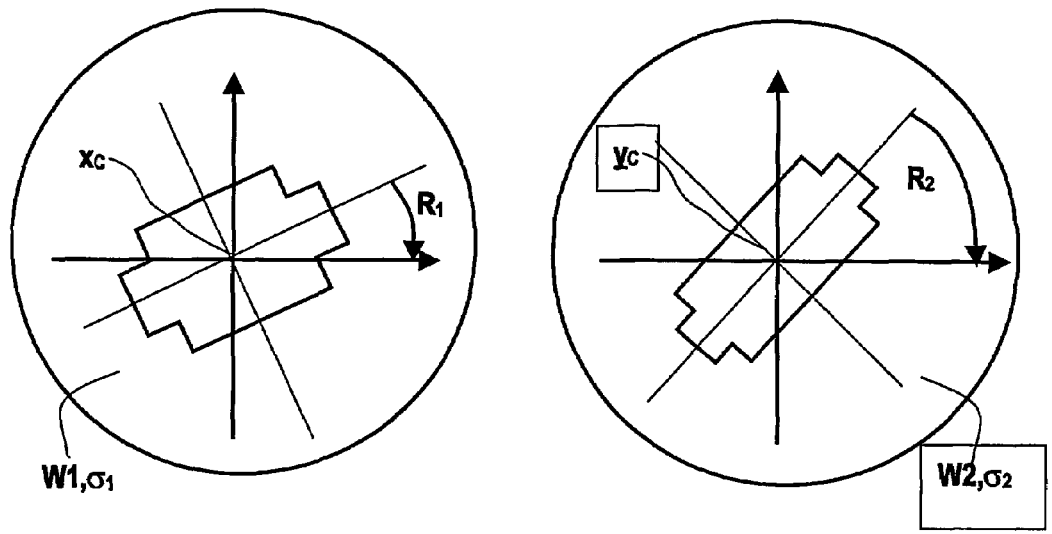
FIG. 2A and FIG. 2B illustrate the matching of two shapes using the correlation means.

FIG. 2 illustrates the principle to find rotation matrices $R_1$ and $R_2$ to apply to image $f(x)$ and $g(y)$ about their respective window center as part of the general processing method outlined in FIG. 1. The case illustrated is for 2-D images (m=2) and when anisotropic scale change is required for matching the two shapes. Rotations $R_1$ and $R_2$ are those which align shape principal directions of respective image signals $f(x)$ and $g(y)$ with predefined co-ordinate axes.

The optimum determination of the rotation matrices $R_1$ and $R_2$ can be done in different ways according to the application, in particular:

If anisotropic scaling has to be introduced for matching the two shapes corresponding to the image signals $f(\underline{x})$ to $g(\underline{y})$, the principal directions of each shape within its window are determined and the images are rotated so that the principal directions coincide with the predefined axes of co-ordinates as schematically shown in FIG. 2.

If no anisotropic scaling needs to be performed, one of the two rotations may be set to the identity (no rotation) and the other is determined as part of the general optimization processing method described with respect to the following step referenced 31 below.

Operations referenced 14, 24, which permit of estimating new converted scalar valued Hermite coefficients $\{F_I\}$ and $\{G_I\}$ referenced 15, 25 that are respectively linear combinations of the old coefficients $\{f_I\}$ and $\{g_I\}$. The linear conversion from the set of scalar valued Hermite coefficients $\{f_I\}$ to the set $\{F_I\}$ is calculated by standard techniques using the first rotation matrix $R_1$. Likewise, the conversion from the set of scalar valued Hermite coefficients $\{g_I\}$ to $\{G_I\}$ makes use of the second rotation matrix $R_2$.

In step referenced 31, for the situations where either anisotropic or isotropic scaling is needed, performing a computation of the combination of the scalar valued Hermite coefficients $\{F_I\}$ and $\{G_I\}$ using a combination function. This computation provides a new set of Hermite Transform Coefficients $K_I$ that will further be used to compute the wanted correlation function $K(\underline{v})$. The combination formula for computing the Hermite Transform Coefficients $K_I$ can favorably be as follows:

$$K_I = \sum_{\{J|I-J=valid\}} \sum_{k=0}^{k=m-1} \left( (-1)^{j_k} \binom{i_k}{j_k} (\beta_k)^{j_k} (\alpha_k)^{i_k-j_k} \right) F_J G_{I-J} \quad (1)$$

where the summation extends over all multi-indices defined by:

$$J = (j_1, j_2, \ldots, j_m) \quad (2a)$$

$$(I-J) = (i_1-j_1, i_2-j_2, \ldots, i_m-j_m) \quad (2b)$$

where $J$ and $(I-J)$ are valid indices or multi-indices, for which all entries are non-negative integers, while $$\binom{i_k}{j_k} \quad (3)$$

stands for a binomial coefficient, and:

where $z_k$ is the scaling factor to apply to the co-ordinate number $k$ of $(\underline{x}-\underline{x}_c)$; and where:

$$\alpha_k = 1/\sqrt{1+z_k^2} \quad (4a)$$

$$\beta_k = z_k/\sqrt{1+z_k^2} \quad (4b)$$

Hence, if anisotropic scaling is needed, the coefficients $\alpha_k$, $\beta_k$ permit of changing scale along all the different axes of co-ordinates.

If isotropic scaling is needed, this is a special case for which all $z_k$ values are equal.

If no scaling is needed, this is another special case for which all $z_k$ values are equal to 1 resulting in that: $\alpha_k = \beta_k = 1/\sqrt{2}$.

In step referenced 32, using Hermite Transform Coefficients $\{K_I\}$, the inverse Hermite Transform ($HT^{-1}$) allows to estimate a further set of scalar coefficients of a function called correlation function $K(\underline{v})$.

In step referenced 33, the correlation function $K(\underline{v})$ is computed, where $\underline{v}$ is a set of translation parameters.

The finally wanted similarity measure and the corresponding optimum translation parameters $\underline{v}$ are given by the maximum value of the correlation function $K(\underline{v})$ estimated among all calculated values.

The number of Hermite coefficients $K_I$ to use and the set of translation parameters $\underline{v}$ for which $K(\underline{v})$ is computed can be determined according to the desired accuracy. For a coarse estimate, only low order indices (I) should be used and only few sampling points for $\underline{v}$ are needed.

Particular add-on technique: In certain cases, a more accurate determination of the relative scale-factors $z_k$, $z'_k$ is desired. The correlation measure $K(\underline{v})$ may not be sufficiently sensitive to scale-change for yielding accurate scale-factors $z_k$, $z'_k$ estimate. A particular add-on technique to be applied to the above method and related processing system is proposed.

Figure 3:
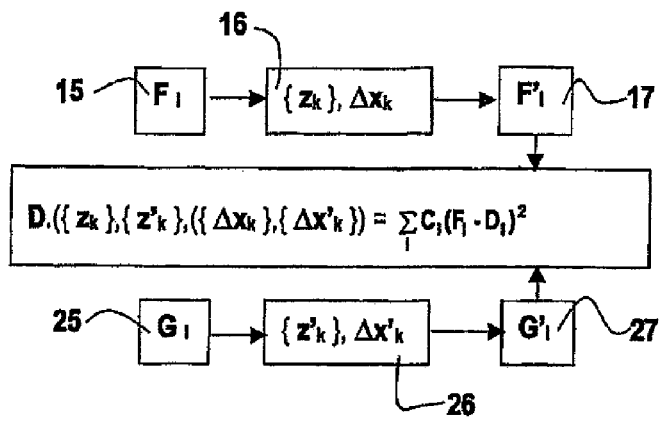
FIG. 3 is a functional block diagram of a particular embodiment of the correlation means of the imaging system of the invention.

Given a "warping law" defined by some combination of anisotropic scale change translation and rotation, the add-on technique consists in deducing the Hermite Transform of the warped pattern from the Hermite Transform of the pattern before warping. For comparing patterns, the proposed add-on technique consists in deducing a "difference measure" of patterns from the difference of their Hermite Transform coefficients. In this way, the warping parameters that result in the best match between the compared patterns can be determined as follows. In this add-on technique, all "warping parameters", including rotation and translation, are determined using the previously described procedure for determining the coefficients $F_I$, $G_I$. From the coefficients $F_I$, $G_I$, then a quadratic difference measure is defined based on said Hermite coefficients $F_I$, $G_I$. The choice of the scale-factors $z_k$, $z'_k$ is the one that minimizes this quadratic difference measure, hereafter denoted by Pattern Disparity Measure D given by the formula:

$$D = \sum_I C_I (F'_I - G'_I)^2 \quad (6)$$

where $F'_I$, and $G'_I$ are derived from the Hermite coefficients $F_I$ and $G_I$ according to the technique illustrated by FIG. 3.

FIG. 3 is a block diagram illustrating the add-on procedure needed when a reliable estimate of the best-match relative scales ($\{z_k\}$, $\{z'_k\}$ need to be evaluated. The add-on procedure requires only the Hermite coefficients $F_I$ and $G_I$ determined in steps 15, 25.

The effect of the relative scaling factors $\{z_k\}$ and $\{z'_k\}$ and, if needed, of translation changes, $(\Delta x_k)$, $\{\Delta x'_k\}$ is to modify the Hermite coefficients through linear operations to yield $F'_I$ and $G'_I$. The linear operations can be matrix operations.

The unknown parameter values are computed as the combination of values, among the possible combinations of $\{z_k\}$ and $\{z'_k\}$, $(\Delta x_k)$, $\{\Delta x'_k\}$, which minimizes the Pattern Disparity Measure D, given by (6), since D is a function of: $(\{z_k\}, \{z'_k\}, (\{\Delta x_k\}, \{\Delta x'_k\})$.

The above combination of steps, from 12, 22 to 33 can be repeated several times if necessary to reach the best possible similarity measure by modifying the rotation matrices $R_1$, $R_2$, the scaling factors $\{z_k\}$ and by increasing the number of indices I, J if more accuracy is needed. A standard strategy may be used for this optimization.

Once this optimization is done, one may derive the best transformation that will provide the best match of one image to the other under the matrix equation form:

$$\underline{x} = R_1^T Z_2 R_2 (\underline{v}-\underline{v}_c) + R_1^T B \underline{v} + \underline{x}_c \quad (5a)$$

and:

$$\underline{v} = R_2^T Z_1 R_1 (\underline{x}-\underline{x}_c) + R_2^T A \underline{v} + \underline{v}_c \quad (5b)$$

where $Z_1$ and $Z_2$ are both (m×m) diagonal matrices with:
matrix $Z_1$ has diagonal element at row and column k, equal to $\sigma_2 z_k/\sigma_1$, and
matrix $Z_2$ has diagonal element at row and column k, equal to $\sigma_1/(\sigma_2 z_k)$;

and where A and B are also both (m×m) diagonal matrices with:
- matrix A has diagonal element at row and column k, equal to $\sigma_2/\alpha_k$, and
- matrix B has diagonal element at row and column k equal to $\sigma_1/\beta_k$, where $\sigma_1, \sigma_2, z_k, \alpha_k, \beta_k, \underline{v}$ are defined above.

Even more economy in computation load can be achieved when one is interested in studying a restricted class of image transformations.

In particular, if only translations in the direction defined by co-ordinate number n is involved, the above evaluations of $\{K_I\}$, can be limited only to multi-indices $I=(i_1, \ldots i_m)$ for which $i_k=0$ for all co-ordinate numbers $k \neq n$. This allows to compute a one dimensional correlation function $K(\underline{v}_n)$ depending on the one dimensional co-ordinate $v_n$ of the m-dimensional translation parameter $\underline{v}$. Considerably less computations are then needed to find the optimum of $K(\underline{v}_n)$ as compared to the calculations needed to find the optimum of $K(\underline{v})$ which has an m-dimensional independent variable.

The present invention further relates to a viewing system having processing means for carrying out the steps of the image processing method and technique of the invention and having display means to visualize the processed images.

Hence, the image processing system of the invention has means for computing the correlation or degree of similarity of two image signals, each signal being defined within a respective isotropic Gaussian window. More specifically, the present system relates to processing means for:

- estimating in 11, 21, two image signals $f(\underline{x})$, $g(\underline{y})$ representing shapes defined in respective windows W1, W2 in two multi-dimensional images (m-D);
- using a Hermite Transform HT in 12, 22, applied to both said image signals $f(\underline{x})$, $g(\underline{y})$ for performing an evaluation of two first sets of scalar valued Hermite coefficients $f_I, g_I, F_I, G_I$ in 13, 15, 23, 25, from which a combination 31 yields a transformed set of scalar valued Hermite coefficients $\{K_I\}$, with scaling factors $\{z_k\}$;
- applying the inverse Hermite Transform $HT^{-1}$ in 32 to said transformed set of scalar valued Hermite coefficients $\{K_I\}$ to achieve the computation of said windowed correlation function $K(\underline{v})$ in 33;
- means to estimate the wanted similarity measure as the maximum of the correlation function $K(\underline{v})$; and
- means for displaying the correlated shapes and/or processed images.

Compared with the state of the art techniques, this current method and system deal with the following issues:

In addition to translation, which is handled by means 31 of computing the scalar valued Correlation Coefficients $\{K_I\}$, and/or in addition to rotation, which is handled by rotation matrices $R_1$ and $R_2$, respectively in 14 and 24, the system of the invention has means 33 of computing the correlation function $K(\underline{v})$, which handles change of scale. This means 33 allows of estimating the effect of altering scale (isotropically or not) in one image signal relative to the other, while, at the same time, taking into account the effect of translation and rotation. This is a unique feature, which is not present in other state of the art approaches to compute local correlation.

Accurate registration is possible with fewer computations than for state of the art methods in particular when large correlation blocks need to be used.

The amount of calculations required to obtain the correlation function is adaptable to the accuracy of match that is required. The number of Hermite coefficients $K_I$ to use and the set of translation parameters $\underline{v}$ for which $K(\underline{v})$ is computed are determined according to the desired accuracy. This method and system permit of calculating the correlation function $K(\underline{v})$ to a desired accuracy in sub-sampling the set of possible translation parameters $\underline{v}$ for which the correlation is to be computed. For a coarse estimate, only low order indices (I) and only few sampling points for $\underline{v}$ are used. This leads to very few calculations if a coarse match is needed, which also minimizes calculations for a "coarse to fine approach".

When the correlation function $K(\underline{v})$ is evaluated in multi-dimensional images, it may be calculated for a translation parameter $\underline{v}$ varying in a direction parallel to one coordinate axis at a time with great saving in computations.

The method and system present a possibility to remove the effect of the local mean intensities from the correlation for example by skipping multi-indices which have all zero entries in the Hermite Transforms of both images.

An important issue that is dealt with by the method and system is a possibility of matching images with inverse contrast. This problem occurs when images coming from different sources such as x-rays and MRI are considered. This problem is solved by looking for both positive maxima AND negative minima of $K(\underline{v})$ and using the absolute value $|K(\underline{v})|$ instead of $K(\underline{v})$. This aspect is important when matching such images coming from different modalities in which case the contrast of an anatomical feature in one image may be inverted with respect to that of the other.

These method and system present a possibility of matching features which have different amplitudes in the two images by dividing $K(\underline{v})$ or $|K(\underline{v})|$ by the product of local root mean square image amplitudes.

Better robustness can be obtained against noise as compared to state of the art. The techniques of the state of the art need to warp one of the images relative to the other even for local correlation. This may produce artifacts and is computationally costly. This is totally avoided in the method and system of the invention for local correlation. Such warping operations are replaced by much simpler manipulations of the Hermite coefficients of the images and of the correlation function.

Figure 2B:
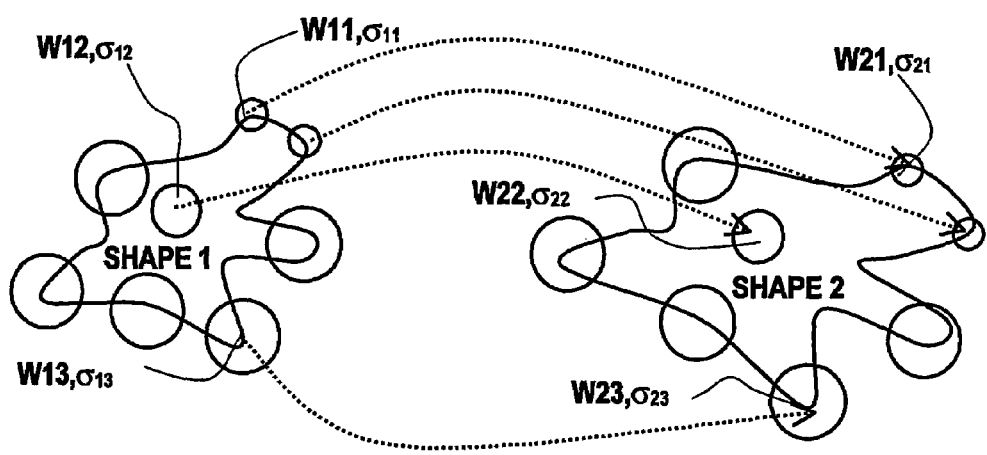

The above-described image viewing method, which is based on a windowed correlation technique, can be used as a key component of a freeform or elastic matching technique. One possible version of such technique is described hereafter as an example. As illustrated by FIG. 2B, a complex shape called SHAPE 1 must be matched to a complex shape called SHAPE 2 represented respectively in a first image and in a second image. For matching SHAPE 1 and SHAPE 2, it may be necessary to warp linearly or non-linearly one of the shapes. The disks shown in the two images of the shapes indicate local windows in each image, in which gray level intensities vary appreciably. Each of the images to match is paved with a number (preferably large) of such windows. To find the warping law, one can proceed in successive iterations as follows:

a) An initial guess of the warping law is provided (for example using a global alignment procedure known from the state of the art), b) For each of the windows W1, such as W11, W12, W13, in one of the images, called first image, which window is centered around a point $\underline{x}_c$, the current guess of the warping law is used in order to find the corresponding location $\underline{t}$ in the other image, called second image, as well as an approximate anisotropic scale change and rotation within the window W1 introduced by the warping law using state of the art technique. The locations of all windows $W2_k$ are looked for in the second image, having their centers $\underline{y}_c^{(k)}$ within a maximum distance from point t, which distance is determined by the algorithm user. If no such window exists in the second image, window W1 is discarded.

c) If the window W1 is not discarded: for each of the windows $W2_k$ in the second image, the method proposed in the invention is used together with the information obtained in above step b) to obtain the correlation between window $W2_k$ in the second image and window W1 in the first image. The maximum correlation $C_k$ is determined together with the corresponding translation $\Delta t_k$ needed to match $W2_k$ in order to the warped window W1 which mapped around point t.

d) The maximum correlation $C_k$ is stored as C together with the corresponding translation $\Delta t_k$ as $\Delta t$.

e) The above two steps (c) and (d) are repeated for all non-discarded windows W1 in the first image. From all the translations □t, modify the warping law to better describe matching of the two images using state of the art techniques. The goodness of fit rate G is calculated from the sum of local correlations C over all windows W1 divided by the number of non-discarded windows W1.

f) Steps b) to e) above are repeated, up to a maximum number of user defined iterations or when the goodness of fit rate G is considered satisfactory (i.e. above a level determined by the algorithm user).

g) The best warping obtained is considered as the one that maximizes the sum of local correlations.

FIG. 2B illustrates the scheme for registration using a given deformation law. Circles symbolize the windows W1 in the first image and the corresponding windows W2 in the second image. The arrows symbolize the correspondence between windows that maximizes the local correlation. For instance, windows W21, W22, W23 in the second image respectively correspond to windows W11, W12, W13 in the first image.

Figure 4:
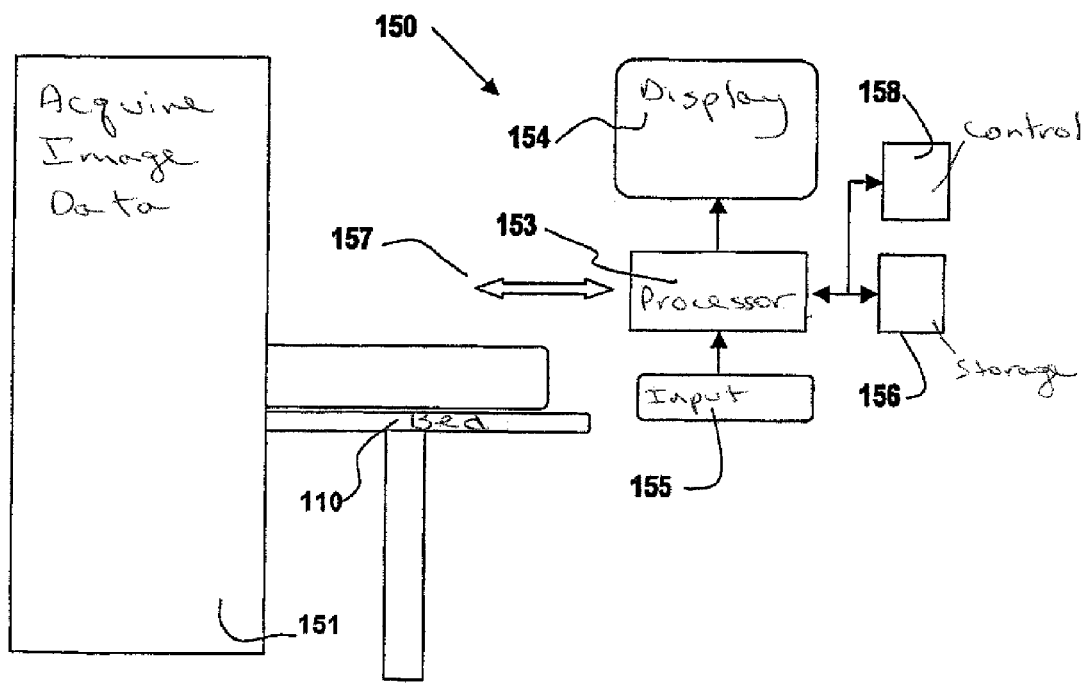
FIG. 4 is a functional block diagram of a medical examination apparatus using the imaging system of the invention.

The above-described steps can be carried out by the viewing system of the invention. FIG. 4 shows a diagram of a medical viewing system 150 according to the invention for carrying out all the steps of the above-described method. The system has means 151 for acquiring digital image data of a sequence of images, and is coupled to computer means 153 for processing these data according to the processing method cited above. The medical viewing system can be used in the intervention room or near the intervention room for processing real time images. Steps of the present method can be applied on stored medical images, for example for estimating medical parameters. The medical viewing system provides the image data by connection 157 to the system 153. The system provides processed image data to display means 154 and/or storage means 156. The display means 154 may be a screen. The storage means 156 may be a memory of the system 153. The storage means 156 may be alternately external storage means.

The data processing means 153 is typically associated with a visualization device, such as a monitor 154, and an input device 155, such as a keyboard, pointing device, such as a mouse, etc. operative by the user so that he can interact with the system. icons may be provided on the screen to be activated by mouse-clicks, or special pushbuttons may be provided on the system, to constitute control means 158 for the user to control the processing means of the system. The data processing device 153 is programmed to implement the method of processing medical image data according to invention. In particular, the data processing device 153 has computing means and memory means to perform the steps of the method. A computer program product having pre-programmed instructions to carry out the method may also be implemented. This image viewing system 153 may comprise a suitably programmed computer, or a special purpose processor having circuit means such as LUTs, Memories, Filters, Logic Operators, that are arranged to perform the functions of the method steps according to the invention.

The basic components of an image viewing system in accordance to the present invention can be incorporated in a medical examination apparatus. As indicated schematically in FIG. 4, the medical examination apparatus typically includes a bed 110 on which the patient lies or another element for localizing the patient relative to the imaging apparatus. The medical imaging apparatus may be a CT scanner 151. The image data produced by the CT scanner 151 is fed to data processing means 153, such as a general-purpose computer, that carries out the steps of the method. Or the medical imaging apparatus may be an Ultrasound apparatus whose images can be processed using the image processing system.

The present invention is applicable regardless of the medical imaging technology that is used to generate the initial data. For example, when seeking to visualize the heart, magnetic resonance (MR) coronary angiography may be used to generate 3D medical image data in a non-invasive manner. Various modifications can be made to the order in which processing steps are performed in the above-described specific embodiment. The drawings and their description herein before illustrate rather than limit the invention. It will be evident that there are numerous alternatives that fall within the scope of the appended claims. Moreover, although the present invention has been described in terms of generating image data for display, the present invention is intended to cover substantially any form of visualization of the image data including, but not limited to, display on a display device, and printing. Any reference sign in a claim should not be construed as limiting the claim.

The invention claimed is:

1. An image processing system, for correlating shapes in multi-dimensional images (m-D), comprising image data processing means for estimating a similarity measure including computing means for:

estimating two image signals ($f(\underline{x})$, $g(\underline{y})$) representing shapes defined in respective windows (W1, W2) in two multi-dimensional images;

using a Hermite Transform (HT) applied to both said image signals for performing an evaluation of two first sets of scalar valued Hermite coefficients ($f_I$, $g_I$, $F_I$, $G_I$), from which a combination yields a transformed set of scalar valued Hermite coefficients $\{K_I\}$;

applying an inverse of the Hermite Transform ($HT^{-1}$) to the transformed set of scalar valued Hermite coefficients $\{K_I\}$ to compute a windowed correlation function ($K(\underline{v})$); and estimating a maximum of said windowed correlation function as the similarity measure to correlate the shapes;

displaying the correlated shapes and processed images; and repeating the steps of determining the windowed correlation function, as many times as necessary in order to reach a best possible windowed correlation function by modifying at least one rotation matrices ($R_1$, $R_2$), at least one scaling factor ($\{z_k\}$) and by increasing a number of indices (I) if more accuracy is needed.

2. The system of claim 1, comprising data processing means for ordering the scalar valued Hermite coefficients ($K_I$, $f_I$, $g_I$) in such a way that low-order coefficients code coarse shape information whereas high order coefficients code fine shape information.

3. The system of claim 1, wherein a class of simultaneous transformations, which is dealt with for any data dimension m, comprises:
translation and a scale-change.

4. The system of claim 1, wherein a class of simultaneous transformations, which is dealt with for data dimensions higher than 1-D, comprises:
translation, scale-change, and, in addition
rotation and anisotropic scale change.

5. The system of claim 4, comprising, for a number of variables superior to one corresponding to data dimensions higher than 1-D, data processing means for:
processing the first two sets of scalar valued Hermite coefficients ($f_I$, $g_I$) by applying at least one rotation matrix (R1, R2) which converts at least one of said two sets of scalar valued Hermite coefficients ($f_I$, $g_I$) into a new set of scalar valued Hermite coefficients ($F_I$, $G_I$) corresponding to a rotated version of at least one of the shapes;
estimating a transformed set of scalar valued Hermite coefficients $\{K_I\}$ from the new sets of scalar valued Hermite coefficients ($F_I$, $G_I$) corresponding to the rotated versions of the shapes.

6. The system of claim 1, comprising data processing means for:
setting the number of scalar valued Hermite correlation coefficients $\{K_I\}$ to use and the set of translation parameters ($\underline{v}$) for which the correlation function ($K(\underline{v})$) is to be computed in order to provide a desired accuracy, according to which for a coarse estimate of only low order indices (I) and a limited number of sampling points for translation parameters ($\underline{v}$) are used, while the maximum value of the correlation function ($K(\underline{v})$, among all calculated values, provides the correlation measure and the corresponding optimum translation parameter ($\underline{v}$).

7. The system of claim 1, comprising data processing means for:
setting the number of scalar valued Hermite correlation coefficients $\{K_I\}$ to use, when only translations in the direction defined by a given co-ordinate number (n) is involved, comprising limiting said evaluations of scalar valued Hermite correlation coefficients $\{K_I\}$ to multi-indices I=($i_1$, . . . ,$i_m$) for which $i_k$=0 for all co-ordinate numbers k≠n, wherefrom computing a one dimensional correlation function ($K(v_n)$) depending on the one dimensional co-ordinate ($v_n$) of the m-dimensional translation parameters ($\underline{v}$).

8. An image processing system, for correlating shapes in multi-dimensional images (m-D), comprising image data processing means for estimating a similarity measure including:
computing means for estimating two image signals (f(x), g(y)) representing shapes defined in respective windows (W1, W2) in two multi-dimensional images;
computing means for using a Hermite Transform (HT) applied to both said image signals for performing an evaluation of two first sets of scalar valued Hermite coefficients ($f_I$, $g_I$, $F_I$, $G_I$), from which a combination yields a transformed set of scalar valued Hermite coefficients $\{K_I\}$;
computing means for applying an inverse of the Hermite Transform ($HT^{-1}$) to the transformed set of scalar valued Hermite coefficients $\{K_I\}$ to compute a windowed correlation function ($K(\underline{v})$) and estimating a maximum of said windowed correlation function as the similarity measure to correlate the shapes;
means for displaying the correlated shapes and processed images; and
further comprising data processing means for performing an evaluation of a warping law for correlating a first and a second complex shape in multi-dimensional images (m-D), including a determination of more than one window (W1) for the first shape and a determination of corresponding candidate windows ($W2_k$) for the second shape, and further comprising data processing means for performing an estimation of the Hermite Transform ($K_I$) for the evaluation of a windowed correlation function K($\underline{v}$), including steps of using a Hermite Transform (HT) of two image signals (f($\underline{x}$), g($\underline{y}$)) defined in respective windows (W1, W2), wherefrom data processing means performs an evaluation of the inverse Hermite Transform ($HT^{-1}$) to compute said windowed correlation function ($K(\underline{v})$), which is used to determine a best windows candidate, and comprising data processing means for performing the determination of the best warping law by iteration of these steps in order to match the first and second complex shapes.

9. An image processing method comprising an evaluation of a Hermite Transform ($K_I$) for the evaluation of a windowed correlation function K($\underline{v}$), including steps of using the Hermite Transform (HT) of two image signals (f($\underline{x}$), g($\underline{y}$)) representing shapes defined in respective windows (W1, W2) in multi-dimensional images (m-D), wherefrom a step of evaluating an inverse of the Hermite Transform ($HT^{-1}$) is performed to compute said windowed correlation function (K($\underline{v}$)), correlating the shapes, repeating the steps of determining the correlation function, as many times as necessary in order to reach a best possible correlation function by modifying at least one rotation matrices ($R_1$, $R_2$), at least one scaling factor ($\{z_k\}$) and by increasing a number of indices (I) if more accuracy is needed, and
visualizing the correlated shapes and/or processed images.

10. The system of claim 1, comprising acquisition means for acquiring medical image data.

11. A computer program product having a set of instructions stored on a computer readable memory medium, when in use on a general-purpose computer, to cause the computer to perform the steps of:
using a Hermite Transform (HT) of two image signals (f($\underline{x}$), g($\underline{y}$)) representing shapes defined in respective windows (W1, W2) in multi-dimensional images (m-D), wherefrom a step of evaluating an inverse of the Hermite Transform ($HT^{-1}$) is performed to compute a windowed correlation function (K($\underline{v}$), correlating the shapes, repeating the steps of determining the correlation function, as many times as necessary in order to reach a best possible correlation function by modifying at least one rotation matrices ($R_1$, $R_2$, at least one scaling factor ($\{z_k\}$) and by increasing a number of indices (I) if more accuracy is needed, and
visualizing at least one of the correlated shapes and processed images.

* * * * *